Sept. 4, 1934.    W. H. RADFORD    1,972,394

SHAFT SEAL

Filed Aug. 26, 1929

INVENTOR
William H. Radford
BY
White, Prost, Fiehe & Lothrop
ATTORNEYS

Patented Sept. 4, 1934

1,972,394

UNITED STATES PATENT OFFICE 1,972,394

SHAFT SEAL

William H. Radford, San Leandro, Calif., assignor to Caterpillar Tractor Co., San Leandro, Calif., a corporation of California Application August 26, 1929, Serial No. 388,329

19 Claims. (Cl. 286—11)

My invention relates to those devices which are utilized for preventing an undesirable communication to the interior of a casing.

As is particularly disclosed in my copending application, Serial No. 273,810, filed April 30, 1928 devices of this character have numerous applications. Thus on industrial devices such as tractors they are expediently employed for sealing the casings which enclose certain of the operating mechanism against the entrance of undesirable foreign matter.

In some instances these devices are utilized to seal an aperture in a casing thru which a moving shaft extends. Under the exigencies of operation it frequently happens that they are subjected to relatively hazardous conditions which are apt to impair the efficiency of their protection. It is therefore an object of my invention to provide a shaft seal in such a manner that it is afforded a relatively greater degree of protection than has been heretofore possible.

In use the industrial devices are often operated continuously for long periods. Under these conditions an operator has little time to care for the device other than to observe and to care for those things actually affecting its immediate operation. One attention usually necessary with seals heretofore has been that of external lubrication. Since this is often overlooked under working conditions it is a further object of my invention to provide a shaft seal which can be operated without lubrication from an external source.

Dependence has heretofore usually been placed upon the contacting of accurately machined surfaces to provide an effective seal. Seals thus dependent are, of course, necessarily expensive and serve to increase the cost of production. Further, when seals of this character are utilized to seal a shaft extending from a casing it is necessary that the axial movement of the shaft be negligible. In the event that the movement is not limited to this extent the seal is ineffective to prevent the passage of the undesirable matter upon axial movement of the shaft. It is accordingly a further object of my invention to provide a shaft seal which does not depend upon fine machining for its effectiveness and further which is useful in sealing a shaft capable of both a rotating and an axial movement. Another object of my invention is the provision of an efficacious sealing means between the wheel and final drive casing of a tractor.

Figure 1:
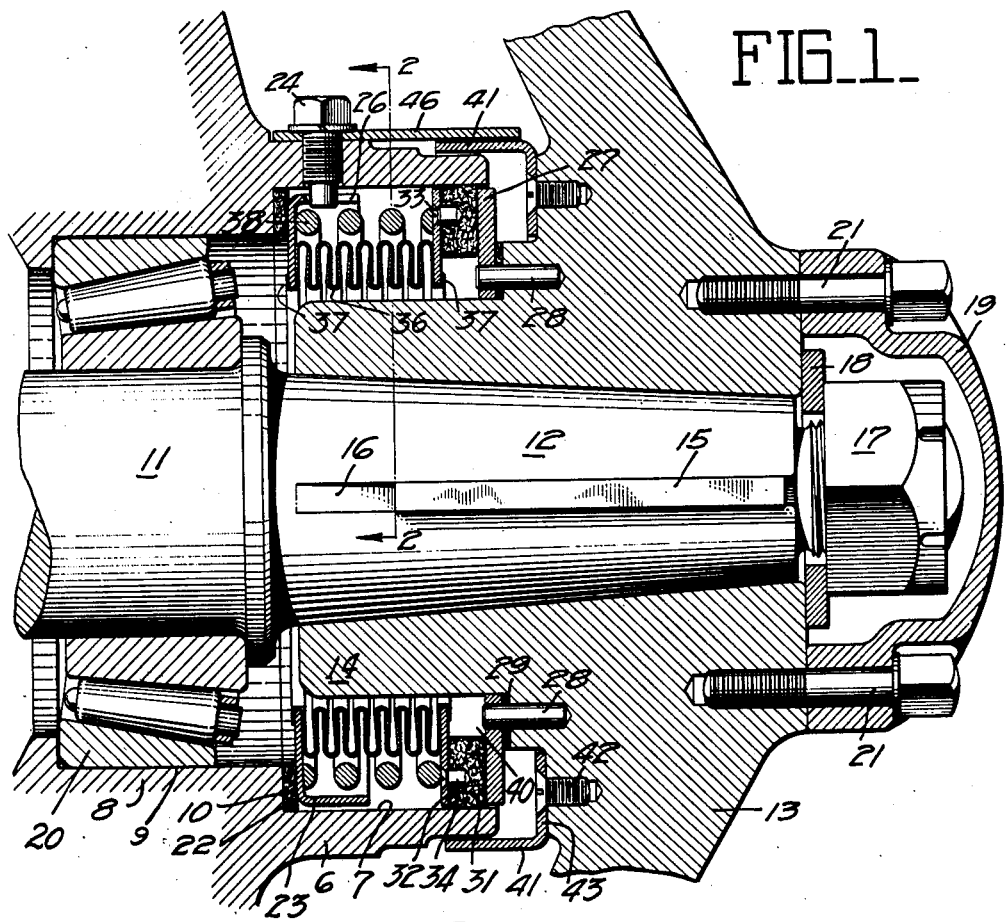

The foregoing and other objects are attained in the embodiment of my invention shown in the drawing, in which, Figure 1 is a cross section of a typical embodiment of my invention; such embodiment being illustrated in connection with the final drive casing of a track-type tractor. The plane of section is taken vertically thru the shaft and various parts are shown in side elevation.

Figure 2:
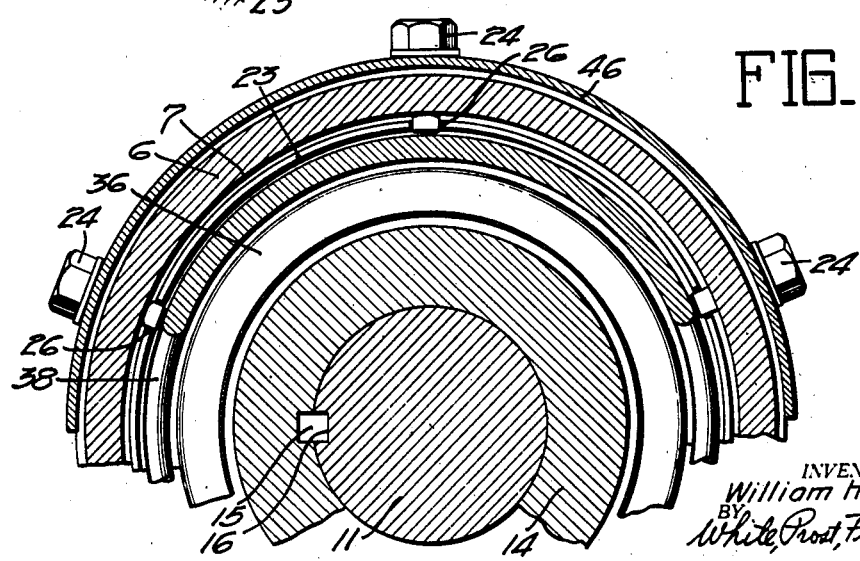

Fig. 2 is a cross section on the line 2—2 of Fig. 1.

In its preferred form, my invention comprises a usually cylindrically apertured housing from which a shaft extends in combination with a flexible sealing means provided between the casing and the shaft in such a manner that the aperture surrounding the shaft is sealed during both axial and rotating movement of the shaft.

In the modification of my invention herein disclosed a casing 6 defines a usually cylindrical aperture 7. An extending portion 8 of the casing further defines another aperture 9 so related to the aperture 7 that a shoulder 10 is formed as is shown in Fig. 1.

Usually a shaft 11 extends from the casing thru the several apertures in such a manner that a free space is left between the casing and the extending shaft. A portion 12 of the shaft is conveniently adapted to be attached to some mechanism for the transmission of power. Thus the shaft portion 12 is formed with a taper upon which a sprocket wheel 13, which I have illustrated in a fragmentary manner in the drawing, is positioned. Hub 14 of the sprocket is usually secured to the shaft by a key 15 which is inserted in keyway 16 provided in the shaft and in the hub. The sprocket is further retained upon the shaft by a locknut 17 and a lock washer 18 which are protected by a cap 19 secured to the hub by studs 21.

The shaft 11 is supported for rotation with respect to the casing 6 by a suitable bearing 20 as is shown in Fig. 1, this bearing, which is of the roller type, is positioned about the shaft in that portion of the casing which defines the aperture designated as 9. Lubrication for the bearing is conveniently provided from the mechanism which drives the shaft 11. This mechanism is not shown but usually comprises a suitable transmission.

Usually the sprocket hub extends into the aperture much in the manner as I have illustrated in Fig. 1. It is accordingly to be noted that a considerable clearance exists between the hub and the surrounding casing so that a ready communication between the casing and the atmosphere in which the hub is rotating is possible. In accordance with my invention I preferably position means between the casing and the sprocket to seal the casing against communication with the atmosphere during the normal movements of the sprocket.

This means is preferably provided much in the following manner:

Adjacent to the shoulder 10 a relatively compressible washer 22 is positioned to seal communication to the casing about a cupped plate member 23. The cup member is loosely mounted within the casing but is retained non-rotatably with respect to the casing by studs 24 which are conveniently adapted to engage slots 26 provided in the cup member.

A disc or ring 27 is affixed by pins 28 to the hub so that it rotates with the hub. A usually compressible washer 29 is positioned between the ring and the hub. The ring 27 is usually of such extent that it is readily admissible into the aperture 7. Adapted to abut the ring and to fit snugly within the aperture is a usually annular collar 31 formed of such material as permits of its use over a long period of time without external lubrication. Such a material is provided by a hard wood which has been soaked in oil or boiled in tallow. Other sealing materials such as cork, fibre, pressed paper, Babbit metal, bronze, gun metal, leather or rawhide may be used in lieu of hard wood. The collar is usually fixed to a metal backing ring or washer 32 by a plurality of counter-sunk screws 33 which engage metal inserts 34 carried by the collar.

In accordance with my invention, I provide further means for sealing the entrance to the casing. Thus I do not depend entirely upon the snug fit provided between the peripheral portion of the collar 31 and the portion of the casing defining the aperture 7. In this manner I am enabled to obviate the hazard presented by wear between these surfaces for which compensation could only be made at relatively great expense. This sealing I preferably accomplish by providing a member joining the cup and the collar in such a manner that they are movable with respect to each other. Such a member is expediently provided in a flexible resilient metal bellows 36 such as that known in the trade as "Sylphon."

The bellows is preferably secured to both the cup member and the metal back of the collar in such a manner as to prohibit any fluid communication thru the joint. Such a juncture is provided by crimping each end of the bellows about the member to which it is to be joined as is indicated at 37. The collar 31 is thus secured non-rotatably with respect to the cup.

To urge the relatively fixed collar 31 into engagement with the rotating ring 27 and to ensure an adequate abutment of their surfaces a spring 38 is preferably positioned between the cup member and the back 32 of the collar. In some instances the spring 38 may be omitted and the resiliency of the bellows depended upon to furnish the desired bias between the collar and the ring.

It is to be noted that a substantially clear passage is provided from the bearing 20 to the juncture of the ring 27 and the annular collar 31. Oil supplied to the bearing can thus pass from the bearing to this juncture so that lubrication of the relatively rotating surface of the ring and the abutting annular collar is effected. Further, it is to be noted that the annular collar and the ring are provided in such a manner that a substantially annular channel 40 is formed adjacent to the abutting ring and collar. This channel serves to retain the lubricant in contact with relatively revolving abutting surfaces. It is also to be noted that the bellows 36 provides numerous receptacles in its several folds in which lubricants can be retained. These serve as reservoirs which function to supply oil to the abutting ring and collar upon movement of the tractor. Thus when the tractor is operating on the side of a hill, oil will pass, on the down hill side, from the folds of the bellows to the annular channel so that a plentiful supply is maintained. On the up-hill side the oil retained in the annular channel suffices to lubricate adequately the contacting surfaces. In this manner the danger of the cutting of the revolving surfaces and failure of the seal is obviated.

To reduce further the quantity of foreign matter which may attempt to enter into the casing and to the shaft seal proper, I provide a shield member 41 which extends about the casing 6. The member is conveniently carried by the hub of the sprocket to which it is secured by counter-sunk screws 42 which engage an extension 43 of the member.

To increase further, the protection afforded the seal, I preferably position an additional shield 46 about that portion of the casing which is normally subjected to the greatest quantity of undesirable material. Thus, as I have indicated in the drawing, the shield is positioned about the uppermost part of the casing to which it is conveniently secured by the studs 24. It is to be noted that the shield 46 extends over and partially surrounds a portion of the shield member 41. Their relationship is preferably of such a nature that the entrance to the seal proper is relatively difficult. The efficiency of the shaft seal is materially increased thru the agency of these protective devices. Further, any foreign matter falling directly onto the casing is deflected away from the seal proper.

Although the seal of my invention is adapted for general utility, it is particularly applicable for sealing wheel bearings and interior mechanisms of a vehicle, such as the bearing for a sprocket shaft of a track-type tractor. The tractor is usually operated in a dusty atmosphere. It is subjected to all types of weather and is frequently run in mud. Unless the bearing is well protected, dirt and moisture, caused by exposure to the elements, will eventually cause breakdown of vital parts. An important feature of my invention, therefore, resides in the provision of an efficacious seal for protecting, against the action of the elements, the type of mechanism described. As set forth in the following claims, the seal of my invention may be embodied in a plurality of forms.

The seal of my invention, which is positioned in a comparatively wide annular space formed between a stationary member and a member movable relative thereto, serves also to prevent effectively leakage of lubricant, as well as entrance of foreign matter. Inner cupped plate member 23 provides an inner, non-rotatable but axially slidable pressure plate which is thrust by the spring means against one of the members forming the annular space; and the backing ring or plate 32 provides an outer pressure plate which is thrust by said spring means against the other of said members which forms the annular space. Furthermore, backing plate 32 is adapted to receive evenly distributed pressure from the spring means 38 to maintain the packing ring or collar 31 in frictional sealing engagement with the rotatable sealing surface provided by annular member 27. Thus, a first line of defense is provided against entrance of foreign matter. As a second line of defense, the flexible sealing member or bellows 36 is in sealing engagement, at one portion thereof, with backing plate 32; the opposite portion of bellows 36 being maintained in sealing engagement with the stationary casing 8 which provides a journal housing.

I claim:

1. A seal between a casing and a member movable therein comprisng means for sealingly engaging said member and said casing, another sealing means abutting said casing, and expansible and contractible means joined to both said sealing means to seal off passage between said sealing means.

2. A seal between a casing, a shaft and a wheel having a hub about said shaft, sealing means engaging said casing and engaging said wheel, and expansible and contractible means extended between said sealing means to prevent passage between said sealing means, said expansible and contractible means being positioned about said hub.

3. A seal between a casing, a shaft and a wheel having a hub about said shaft, sealing means engaging said casing and engaging said wheel, a spring urging said means apart, and expansible and contractible means extended between said sealing means to prevent passage between said sealing means, said expansible and contractible means and said spring being positioned about said hub.

4. A seal between a casing and a tractor wheel hub rotatable within the casing, comprising an annular member about the hub, a sealing collar about the hub and adapted to abut the annular member, a second sealing means loosely mounted within the casing and adapted to abut the casing, spring means thrusting the collar against the annular member and the second sealing means against the casing, and a flexible bellows between the collar and the second sealing means.

5. A seal between a casing and a tractor wheel hub rotatable within the casing, comprising an annular member rotatable with the hub, a sealing collar about the hub and adapted to abut the annular member, a second sealing means loosely mounted within the casing and adapted to abut the casing, spring means thrusting the collar against the annular member and the second sealing means against the casing, a flexible bellows attached to the collar and the second sealing means, and means for retaining the second sealing means against rotation.

6. In a device of the class described, a casing; a member rotatable within the casing; an annular sealing unit within the casing about said rotatable member and adapted to be inserted axially into the casing; said unit comprising a plate, a collar spaced from the plate, a backing member secured to the collar and a flexible bellows secured to the plate and to the backing member; a wheel without the casing and mounted for rotation with the member rotatable within the casing; an annular plate secured for rotation with the wheel; and spring means within the casing thrusting the plate of the sealing unit against the casing and the collar against the annular plate secured for rotation with the wheel.

7. A seal structure between a rotatable member and a stationary member forming an annular space therebetween in which the seal structure is located, comprising an annular cup-shaped plate member, means for loosely mounting said cup-shaped member in said space for slidable but non-rotatable movement, a second plate member spaced from said cup-shaped plate member, a packing collar interposed between said second plate member and said rotatable member, spring means interposed between said cup-shaped member and said second plate member to thrust them apart, said non-rotatable cup-shaped member being thrust against said stationary member and said second plate member toward said rotatable member to maintain the packing collar in sealing engagement, and annular flexible sealing means between said cup-shaped member and said second plate member to seal off the space therebetween.

8. A seal structure between a rotatable wheel member mounted on a rotatable shaft and a stationary journal housing for the shaft forming an annular space therebetween in which the seal structure is located, comprising a first plate member, means for loosely mounting said first plate member in said space for slidable but non-rotatable movement, a second plate member spaced from said first plate member, a packing collar interposed between said second plate member and said rotatable wheel member spring means about said shaft and interposed between said plate member to thrust said plate members apart, said non-rotatable first plate member being thrust against said stationary journal housing and said second plate member toward said rotatable wheel member to maintain the packing collar in sealing engagement, annular flexible sealing means between said plate members to seal off the space therebetween, and means serving both to secure said wheel on said shaft and to maintain the sealing means in position in said space.

9. A seal structure between a rotatable wheel member mounted on a rotatable shaft and a stationary journal housing forming an annular space therebetween in which the seal structure is located, comprising an annular plate member L-shaped in section to provide a cup, a pin on said stationary member engaging in an opening in said L-shaped member to preclude rotation but to allow slidable movement of said L-shaped member, a second plate member spaced from said L-shaped member, a packing collar interposed between said second plate member and said rotatable wheel member, spring means in said space and interposed between said plate members to thrust said plate members apart, said L-shaped member being thrust against said stationary journal housing and said second plate member toward said rotatable wheel member to maintain the packing collar in sealing engagement, and annular flexible sealing means between said L-shaped plate member and said second plate member to seal off the space therebetween.

10. A seal structure between a casing member and a second member therein, one of said members being movable and another thereof being stationary; comprising means for sealingly engaging both said casing member and said second member, another sealing means abutting the stationary member, and expansible and contractible means joined to both said sealing means to seal off passage between said sealing means.

11. A seal structure between a casing member and a second member therein forming an annular space therebetween, one of said members being movable and another thereof being stationary; comprising annular means for sealingly engaging both said casing member and said second member, another sealing means abutting the stationary member, means for loosely mounting said another sealing means in said space for slidable but non-rotatable movement, spring means for thrusting said sealing means apart, and expansible and contractible means joined to both said sealing means to seal off passage between said sealing means.

12. A seal structure between a rotatable tractor wheel member mounted on a rotatable shaft and a stationary journal housing for the shaft forming an annular space therebetween, comprising spaced sealing means engaging said wheel member and said stationary journal housing, spring means thrusting against and urging said sealing means apart, and expansible and contractible means extended between said sealing means to prevent passage between said sealing means, said expansible and contractible means and said spring means being positioned in said annular space.

13. A seal structure between a stationary casing having an open end and a tractor wheel rotatably mounted adjacent said end by drive means extending through the casing; comprising an annular plate member mounted for rotation with said wheel and positioned adjacent said open end of the casing, an annular packing collar having one face adapted to be maintained in frictional sealing engagement with said annular plate member, a second annular plate member adapted to engage the opposite face of said packing collar, spring means within the casing bearing against said second annular plate member to maintain said packing collar and said first-mentioned annular plate member in sealing engagement, and additional sealing means within the casing including an annular flexible member having sealing engagement with said second annular plate member.

14. A seal structure between a stationary casing having an open end and a tractor wheel rotatably mounted adjacent said end by drive means extending through the casing; comprising an annular plate member mounted for rotation with said wheel and positioned adjacent said open end of the casing, an annular packing collar having one face adapted to be maintained in frictional sealing engagement with said annular plate member, a second annular plate member adapted to engage the opposite face of said packing collar, spring means within the casing bearing against said second annular plate member to maintain said packing collar and said first-mentioned annular plate member in sealing engagement, additional sealing means within the casing including an annular flexible member having sealing engagement with said second annular plate member, and means for maintaining said annular flexible member in sealing relationship with said casing.

15. A seal structure between a stationary casing having an open end and a final drive tractor wheel rotatably mounted adjacent said end by drive means extending through the casing, comprising an annular plate member positioned adjacent the open end of said casing, means for mounting said member for rotation with said wheel including pins mounted on the wheel and passing into said member, an annular packing collar having a face adapted to be maintained in frictional sealing engagement with said annular plate member, a second annular plate member adapted to engage the opposite face of said packing collar, spring means within the casing bearing against said second annular plate member to maintain said packing collar and said first-mentioned annular plate member in sealing engagement, additional sealing means within the casing including an annular flexible member having sealing engagement adjacent one portion thereof with said second annular plate member, and means for maintaining another portion of said annular flexible member in non-rotatable sealing engagement with said casing.

16. A seal structure between a stationary casing having an open end and a tractor wheel rotatably mounted adjacent said end by drive means extending through the casing, comprising an annular seal-engaging surface rotatable with said wheel and adjacent said open end of the casing, an annular packing collar having one face adapted to be maintained in frictional engagement with said surface, a backing pressure plate adapted to engage the opposite face of said packing collar, spring means within the casing bearing against said pressure plate to maintain said packing collar and said surface in sealing engagement, and additional sealing means including a non-rotatable but axially movable flexible shield connected between said pressure plate and said casing.

17. A seal structure between a stationary final drive casing having an open end and a tractor wheel rotatably mounted with the inner face of said wheel adjacent said open end, said wheel having a rotatable hub projecting well into said casing and forming with the inner wall of said casing a comparatively wide annular space; the seal structure comprising an annular sealing ring about said hub fastened at the inner face of said wheel and positioned adjacent the open end of said casing, a packing ring surrounding the portion of said hub adjacent the inner face of said wheel and adapted to be maintained in frictional sealing engagement with the inner face of said annular sealing ring, a backing plate for said packing ring adapted to provide a pressure surface against which spring means can bear to maintain said packing ring in frictional engagement with the inner face of said sealing ring, spring means about said hub and in said comparatively wide annular space to apply even pressure distribution on said backing plate, an annular flexible member in said annular space and having sealing engagement at one portion thereof with said backing plate, means for effecting sealing engagement of another portion of said annular flexible member with said stationary casing, and means at said another portion of said annular flexible member to hold it against rotation.

18. A seal structure between a stationary member and a tractor wheel rotatably mounted with the inner face of said wheel adjacent an end of said member, said wheel having a part rotatable therewith in overlapping relationship with said member and forming with a wall of said member a comparatively wide annular space in which the seal structure is located; the seal structure comprising an annular sealing surface on the inner face of said wheel and adjacent said end of said stationary member, an annular packing member adapted to be maintained in frictional engagement with said sealing surface, a backing plate for said packing member adapted to provide a pressure surface against which spring means can bear to maintain said packing member in frictional engagement with said sealing surface, spring means in said comparatively wide annular space to apply even pressure distribution on said backing plate, an annular flexible member in said annular space and having sealing engagement at one portion with said backing plate, and means for effecting sealing engagement of another portion of said annular flexible member with said stationary member.

19. A seal structure between a stationary member and a tractor wheel rotatably mounted with the inner face of said wheel adjacent an end of said member, said wheel having a part rotatable therewith in overlapping relationship with said member and forming with a wall of said member a comparatively wide annular space in which the seal structure is located; the seal structure comprising an annular sealing surface on the inner face of said wheel and adjacent said end of said stationary member, an annular packing member adapted to be maintained in frictional engagement with said sealing surface, a backing plate for said packing member adapted to provide a pressure surface against which spring means can bear to maintain said packing member in frictional engagement with said sealing surface, spring means in said comparatively wide annular space to apply even pressure distribution on said backing plate, an annular flexible member in said annular space and having sealing engagement at one portion with said backing plate, means for effecting sealing engagement of another portion of said annular flexible member with said stationary member, and means adjacent said another portion of said annular flexible member to hold it against rotation.

WILLIAM H. RADFORD.